June 25, 1929.     B. F. SCHMIDT     1,718,258
BRAKE OPERATING MECHANISM
Filed June 17, 1926
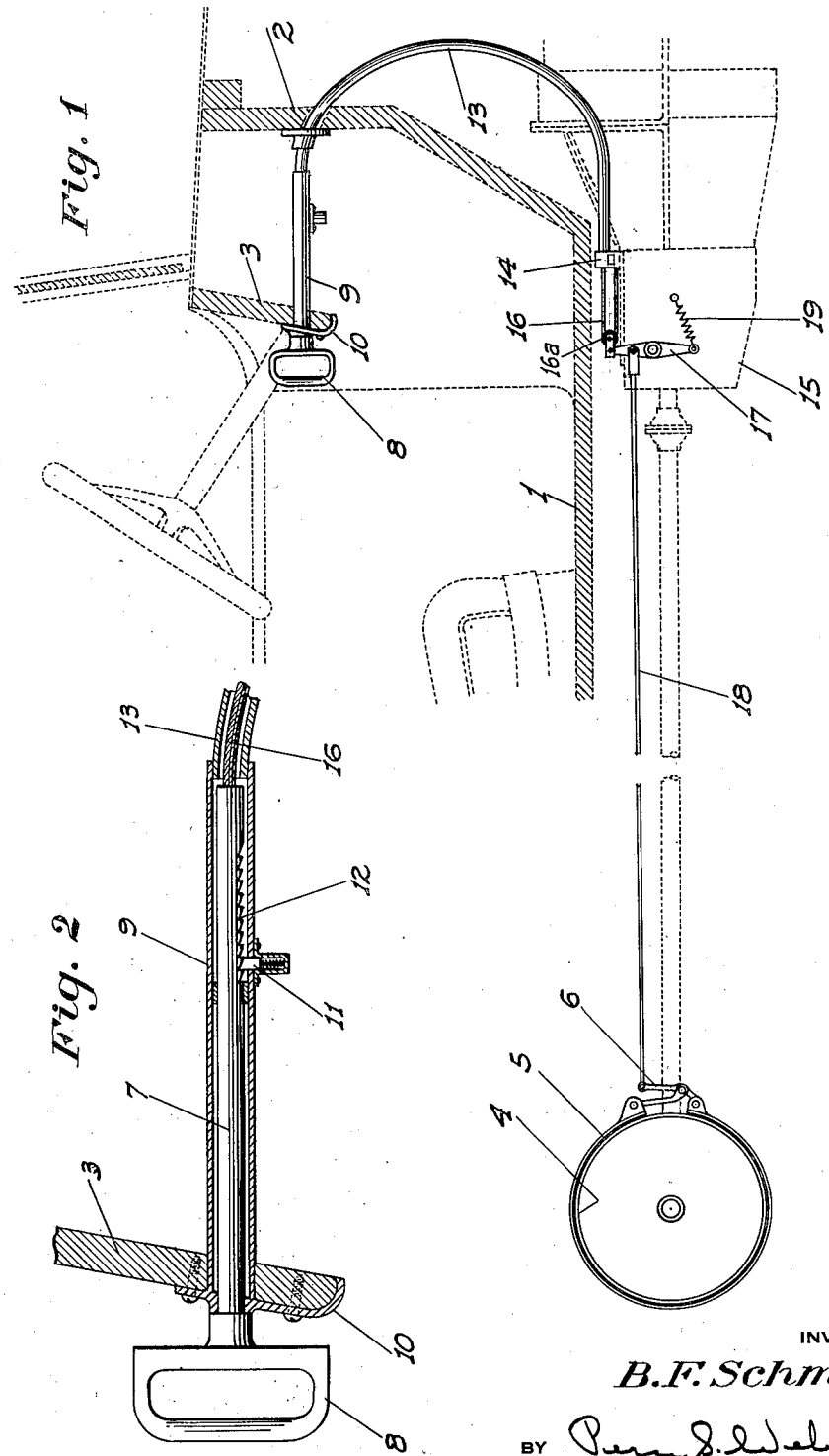
INVENTOR
*B.F.Schmidt*
BY
ATTORNEY Patented June 25, 1929.

1,718,258

UNITED STATES PATENT OFFICE.

BENJAMIN F. SCHMIDT, OF LOS ANGELES, CALIFORNIA, ASSIGNOR TO GILLETTE SCHMIDT CORPORATION, OF LOS ANGELES, CALIFORNIA, A CORPORATION OF DELAWARE.

BRAKE-OPERATING MECHANISM.

Application filed June 17, 1926. Serial No. 116,575.

This invention relates to improvements for operating the emergency or hand brakes of motor vehicles; my principal object being to provide a mechanism for the purpose including a handle member mounted on the dashboard of the vehicle and adapted to be pulled horizontally and rearwardly to effect the setting of the brakes; and a flexible element between the handle member and the usual brake actuating rod or lever, so arranged as to eliminate the necessity of pulleys or the like to give said element the necessary reversal of direction of movement between its ends.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a sectional side outline of the driver's compartment of a motor vehicle showing my brake actuating mechanism as applied thereto and operatively connected with the brake structure of the vehicle.

Fig. 2 is an enlarged sectional elevation of the operating handle and adjacent parts.

Referring now more particularly to the characters of reference on the drawings, the numeral 1 denotes the floor of the car in the driver's compartment, at the forward end of which is the usual vertical bulkhead 2 with the instrument or dashboard 3 disposed a certain distance rearwardly of the bulkhead. 4 represents the brake drum on one of the rear wheels of the vehicle and 5 the brake band on the drum, there being the usual brake tightening structure connected to the ends of the band which includes a vertical arm 6 arranged when pulled forward to clamp the band onto the drum. My improved brake operating mechanism, arranged in connection with these standard parts, comprises a rigid rod or shaft 7 to extend longitudinally of the vehicle and having a handle 8 on its rear end. This shaft is slidable in a rigid tubular housing 9 which is adapted to be rigidly attached to the dashboard 3 in any suitable manner, as by means of a flange or bracket 10 on its rear end to abut against and be secured onto the dashboard, as shown in Fig. 2. The handle of course projects beyond the rear end of the housing and consequently is disposed to the rear of the dashboard.

Mounted in connection with the housing intermediate its ends is a spring pressed radial pawl 11 adapted to engage any one of a longitudinal row of notches 12 cut transversely in one face of the shaft. The notches and pawl are so disposed that when the shaft is pulled rearwardly the pawl prevents retractive movement of the shaft. The shaft however is turnable in the housing so that if the handle is given a slight twist to turn the shaft somewhat the pawl will be disengaged from any notch and the shaft may move inwardly of the housing to its normal position.

Attached to the inner end of the housing 9 is a semi-rigid housing 13, the housing 13 having inherent flexibility sufficient only to enable it to be suitably bent or curved during installation, so as to avoid any rigid and immovable parts of the car. This housing extends through the bulkhead 2 and downwardly to a termination at a suitable point under the floor 1 so that it then faces rearwardly. It is clamped against displacement at such end by suitable means, as for instance a bracket 14 attached to a rigid member of the car, such as the transmission casing 15.

Connected to the inner end of the shaft 7 and enclosed in the housing 13 is a flexible but non-extensible element such as a steel cable 16. This cable projects beyond the rear end of the housing 13 and passes about a pulley 16ª connected to one end of a vertical lever 17 which is pivoted intermediate its ends onto the casing 15 or adjacent part. Said cable then extends forwardly to a fixed connection with the bracket 14 or similar part.

A rod 18 extends between the lever 17 and the arm 6, these parts being so disposed that when the lever is pulled forwardly by a forward movement of the lower end of the cable 16 (which is had by a rearward movement of the upper end of the cable and the shaft 7) the brakes will be set. A spring 19 applied to the lever 17 acts to pull the latter to its normal and brake releasing position, and hence pulls the cable 16 in a direction such that the shaft 7 will be withdrawn into the housing or will be held in firm engagement with the pawl until said shaft is released from the pawl in the manner previously set forth.

Though I have shown only a single brake drum and brake, it will be obvious that a single operating cable arrangement can be easily connected to a pair of brake bands by suitable connection with the member 17.

It will also be obvious that while I have shown the brake drum as being arranged in connection with the rear axle of the vehicle, a band on a drum located on the drive shaft, rearwardly of the transmission as is commonly done, could also be readily connected to my actuated structure.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. Operating means for a motor vehicle brake including with a lever pivoted on the vehicle and operatively connected to the brakes, a flexible element connected at one end to the lever, a handle for pulling and turning the element connected to the other end of the same, guide means for the said element, means for holding the element at its handle end against retraction from any position to which it has been moved by a pull on the handle, and means whereby when a turning movement is applied to the handle said element will automatically return to its retracted position, and when the turning pressure on the handle is released said member will reassume its normal unrotated position.

2. Operating means for a motor vehicle brake including with a lever pivoted on the vehicle and operatively connected to the brakes, a flexible cable connected at one end to the lever, a handle for pulling and turning the cable connected to the other end of the same, a tubular housing in which the cable is enclosed and guided, means for holding the cable against retraction from any position to which it has been moved by a pull on the handle, and means whereby a turning movement applied to the handle will cause the cable to automatically return to its retracted position; the cable having an inherent springiness tending to cause it to reassume its normal position after being twisted, whereby to cause said cable to return to such position when the turning pressure on the handle is released.

In testimony whereof I affix my signature.

BENJAMIN F. SCHMIDT.